(12) United States Patent
Ho (10) Patent No.: US 7,011,694 B1
(45) Date of Patent: Mar. 14, 2006

(54) CO₂-SELECTIVE MEMBRANES CONTAINING AMINO GROUPS

(75) Inventor: W. S. Winston Ho, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 255 days.

(21) Appl. No.: 10/145,297

(22) Filed: May 14, 2002

Related U.S. Application Data (60) Provisional application No. 60/290,759, filed on May 14, 2001.

(51) Int. Cl.
*B01D 53/22* (2006.01)
*B01D 71/64* (2006.01)

(52) U.S. Cl. ............. 95/51; 96/10; 96/14; 210/500.39; 528/310

(58) Field of Classification Search ................ 95/45, 95/51; 96/4, 8, 10, 14; 210/500.37, 500.38, 210/500.39; 528/310
See application file for complete search history.

(56) References Cited

U.S. PATENT DOCUMENTS

| | | | |
|---|---|---|---|
| 4,230,463 A | | 10/1980 | Henis et al. |
| 4,242,208 A | * | 12/1980 | Kawaguchi et al. ... 210/500.28 |
| 4,551,156 A | * | 11/1985 | Li ................... 95/47 |
| 4,659,343 A | | 4/1987 | Kelly |
| 4,690,873 A | * | 9/1987 | Makino et al. ........ 96/10 |
| 4,981,497 A | * | 1/1991 | Hayes ............ 95/51 |
| 5,032,149 A | * | 7/1991 | Hayes ............ 95/53 |
| 5,034,027 A | * | 7/1991 | Tien et al. ........ 95/54 |
| 5,074,891 A | * | 12/1991 | Kohn et al. ............ 95/47 |
| 5,085,676 A | | 2/1992 | Ekiner et al. |
| 5,207,908 A | * | 5/1993 | Koenhen et al. ......... 210/490 |
| 5,215,554 A | | 6/1993 | Kramer et al. |
| 5,232,472 A | * | 8/1993 | Simmons et al. ........... 96/14 |
| 5,248,319 A | * | 9/1993 | Ekiner et al. ............. 95/54 |
| 5,266,100 A | * | 11/1993 | Simmons ............... 95/43 |
| 5,320,650 A | * | 6/1994 | Simmons ............... 96/14 |
| 5,334,697 A | | 8/1994 | Simmons |
| 5,558,936 A | | 9/1996 | Chung et al. |
| 5,591,250 A | | 1/1997 | Stern et al. |
| 5,611,843 A | | 3/1997 | Ho |
| 5,618,332 A | | 4/1997 | Ekiner et al. |
| 5,679,133 A | | 10/1997 | Moll et al. |

(Continued)

FOREIGN PATENT DOCUMENTS

JP        06071148 A     3/1994

(Continued)

*Primary Examiner*—Robert H. Spitzer
(74) *Attorney, Agent, or Firm*—King & Schickli, PLLC (57) ABSTRACT

Novel compositions suitable for fabrication of CO₂-selective membranes are disclosed. In one aspect, the present invention is directed to compositions comprising polyimide/polyamine blends and copolymers, and to compositions comprising interfacially polymerized polyamides. In another aspect this invention is directed to novel $CO_2$-selective membranes comprising such polyimide/polyamine blends and copolymers, and to novel $CO_2$-selective membranes comprising interfacially polymerized polyamides. In yet another aspect, the present invention is directed to a novel water-gas-shift (WGS) reactor comprising the novel $CO_2$-selective membranes. Advantageously, the use of the novel $CO_2$-selective membrane allows alteration of the normal WGS reaction equilibrium, shifting the reaction towards production of $H_2$. Carbon dioxide on the high pressure, feed gas side of the membrane reactor reacts with the novel membranes of the present invention at the interface between the feed gas and the membrane. The reaction product permeates through the membrane to the interface between the feed gas and the low pressure side of the membrane, where the $CO_2$ desorbs into the low pressure side and is removed.

40 Claims, 5 Drawing Sheets

U.S. PATENT DOCUMENTS

| | | |
|---|---|---|
| 5,702,503 A | 12/1997 | Tse Tang |
| 5,725,633 A * | 3/1998 | Ozcayir et al. ............... 95/45 |
| 5,756,643 A | 5/1998 | Ho et al. |
| 5,820,659 A | 10/1998 | Ekiner et al. |
| 5,837,032 A | 11/1998 | Moll et al. |
| 5,882,382 A | 3/1999 | Hachisuka et al. |
| 5,922,104 A * | 7/1999 | Park et al. ............... 95/51 |
| 5,939,520 A * | 8/1999 | Langsam ............... 528/350 |
| 6,156,097 A * | 12/2000 | O'Brien et al. ............... 95/51 |
| 6,156,381 A | 12/2000 | Leong et al. |
| 6,171,472 B1 | 1/2001 | Lokhandwala et al. |
| 6,296,684 B1 * | 10/2001 | Ekiner ............... 95/45 |
| 6,383,258 B1 * | 5/2002 | Simmons ............... 95/45 |
| 6,383,265 B1 * | 5/2002 | Ekiner ............... 96/10 |
| 6,660,062 B1 * | 12/2003 | Liu et al. ............... 95/45 |

FOREIGN PATENT DOCUMENTS

| | | |
|---|---|---|
| WO | WO/98/41308 | 9/1998 |

* cited by examiner

CO₂-SELECTIVE MEMBRANES CONTAINING AMINO GROUPS

This application claims the benefit of U.S. Provisional Patent Application Ser. No. 60/290,759 filed May 14, 2001. This invention was partially made with Government support under DOE grant no. DE-FC04-01AL67629. The Government may have certain rights in this invention.

TECHNICAL FIELD

The present invention relates in general to polymers suitable for forming membranes for separation of $CO_2$ from gaseous streams rich in $H_2$, $CO_2$, and CO, and to water-gas-shift reactors comprising such membranes.

BACKGROUND OF THE INVENTION

Water gas shift (WGS) reactors for the catalyst-driven conversion of CO and water to $H_2$ and $CO_2$ are widely known in the chemical and petroleum industries. The reactors are also useful in processes relating to the conversion of fuels, including gasoline, diesel, methanol, ethanol, natural gas, and coal, to $H_2$ for use in generation of electricity by fuel cells for use in, e.g., fuel cell vehicles, mobile power, home electricity, and stationary power applications.

The reversibility of the WGS reaction at equilibrium ordinarily results in an inefficient reaction necessitating a bulky reactor and producing a $H_2$ product contaminated with a high concentration of unconverted CO, and with an undesirable concentration of $CO_2$. Carbon monoxide contamination in the hydrogen fuel produced from a conventional WGS reactor has detrimental effects on fuel cell performance, including poisoning the platinum-based catalyst at the anode of the fuel cell. For example, 30 ppm of CO may cause a 48% drop in the output cell voltage of a proton exchange membrane (PEM) fuel cell, from 0.6 volts to 0.31 volts at 150 amperes. Output decreases of up to 90% at a current density of 650 amperes/ft² may be expected from the use of an $H_2$ product containing 100 ppm of CO. Additionally, $CO_2$ in excess quantities dilutes the $H_2$ product and increases the mass transfer resistance as well as producing CO via the reverse WGS reaction at the anode, thereby further reducing fuel cell efficiency.

Accordingly, there is need in the art for novel WGS reactors comprising membranes which are able to shift the equilibrium of the reaction to production of $H_2$ while minimizing CO contamination, thereby enhancing the purity of the final product. There is further need in the art for reactors which are capable of efficiently producing hydrogen via the WGS reaction, while requiring a smaller reactor size, thereby enhancing their utility in applications where space is at a premium such as in fuel cells for use in electric or hybrid vehicles.

SUMMARY OF THE INVENTION

In accordance with the purposes of the present invention as described herein, in one aspect novel compositions of matter are provided comprising a polyimide hard segment and an amino group-containing soft segment comprising a polyamine. The polyamines may be selected from the group consisting of poly (2-vinylpyridine), poly (4-vinylpyridine), polyethylenimine, polyallylamine, or any mixture thereof. Typically, the polyamines selected include polyethylenimines having a molecular weight of from about 600 to about 70,000 and polyallylamines having a molecular weight of from about 10,000 to about 60,000.

The hard segment of the compound of the present invention may be derived from a dianhydride having between about 8 and about 20 carbons and a diamine having between about 2 and about 30 carbons. Typically, the dianhydride is an aromatic compound, and may be selected from one of the group consisting of pyromellitic dianhydride (PMDA), 3,3',4,4'-benzophenone tetracarboxylic dianhydride, 4,4'-(hexafluoroisopropylidene)bis(phthalic anhydride), 4,4'-oxydiphthalic anhydride, diphenylsulfone-3,3'4,4'-tetracarboxylic dianhydride, and 3,3',4,4'-biphenyltetracarboxylic dianhydride. The diamine may be selected from the group consisting of phenylene diamine, methylene dianiline (MDA), methylene di-o-chloroaniline (MOCA), methylene bis(dichloroaniline), methylene dicyclohexylamine, methylene dichlorocyclohexylamine, methylene bis(dichlorocyclohexylamine), 4,4'-(hexafluoroisopropyledine)-bisaniline, 3,3'-diaminophenyl sulfone, 4,4'-diaminophenyl sulfone, 4,4'-dimethyl-3,3'-diaminohenyl sulfone, 2,4'-diamino cumene, methylene bis(di-o-toluidine), oxydianiline, bisaniline A, bisaniline M, bisaniline P, thiodianiline, 2,2-bis[4-(4-aminophenoxy)phenyl]sulfone, 4,4'-bis-(4-aminophenoxy) biphenyl, 1,4-bis(4-aminophenoxy) benzene, and 1,3-bis(4-aminophenoxy) benzene.

The composition of the present invention may also include at least one salt of an amino acid selected from salts having the formulae:

wherein $R_1$, $R_2$ and $R_3$ are hydrogen or alkyl groups having from 1 to 4 carbon atoms, n is an integer ranging from 0 to 4, $A^{m+}$ is a cation having a valence of 1 to 3 and selected from metals of Groups IA, IIA, and IIIA of the Periodic Table of Elements and an amine cation having the formula:

wherein $R_4$ and $R_5$ are hydrogen or alkyl groups having from 1 to 4 carbon atoms, $R_6$ is hydrogen, an alkyl group of from 1 to 4 carbon atoms or an alkyl amine of from 2 to 6 carbon atoms and 1 to 4 nitrogen atoms, y is an integer ranging from 1 to 4, and m is an integer equal to the valence of the cation.

The interfacially polymerized polyamides of the invention may be synthesized from a polyamine, an acid chloride, and an organic solvent. The polyamine may be selected from the group consisting of polyethylenimine, polyallylamine, and any mixture thereof. Typically, the polyamine of choice is polyethylenimine. The acid chloride may be trimesoyl chloride, isophthaloyl chloride, and any mixture thereof. The organic solvent may be an isoparaffinic solvent, decane, dodecane, nonane, and any mixture thereof.

Typically, the amine group-containing soft segment will include a polyamine as described above in an amount of from about 30 to about 90 weight percent of the entire composition. The hard segment of the composition of the present invention may include a polyimide as described above in an amount of from about 10 to about 70 weight percent of the entire composition.

In another aspect of the present invention, membranes comprising the novel polyimide/polyamine compositions as described above are provided. Membranes comprising interfacially polymerized polyamides are also provided. Any of a number of known techniques are suitable for fabricating the membranes of this invention, such as knife casting, dip casting, or the like. The membranes may be fabricated to any desired shape, such as flat sheets or hollow fibers, in accordance with the desired use therefor.

The membranes of the present invention are highly selective for $CO_2$, with the $CO_2$ selectivity being provided by the amino group-containing soft segments. Advantageously, the membranes are also highly thermostable, with the thermostability being provided by the polyimide hard segments. In a preferred embodiment, the present invention provides a $CO_2$-selective membrane having a $CO_2$ selectivity of at least about 75, a $CO_2$ permeability of at least about 6000 GPU, and thermal stability at temperatures greater than about 200 C. As will be described below, the selectivity and thermal stability of the membranes of this invention provide significant advantages in the use thereof for producing an $H_2$-enriched product from a mixed gas feed stream.

Accordingly, in yet another aspect of the present invention, a novel process for purifying $H_2$ from a mixed gaseous stream containing $H_2$ is provided. The process comprises contacting the gaseous stream, provided at any desired feed pressure in accordance with the method being conducted, with a first side of the $CO_2$-selective membrane of this invention as described above, followed by removing the $CO_2$-rich permeate from the low pressure, obverse side of the membrane. The membrane preferentially transports $CO_2$ by a facilitated transport mechanism, while $H_2$ is rejected by the membrane. Accordingly, a $H_2$-enriched retentate remains for subsequent processing and use.

The WGS reaction for catalyst-driven conversion of CO and water to $H_2$ and $CO_2$ is known in the chemical and petroleum industries, and has potential application in the conversion of fuels, such as gasoline, diesel, methanol, ethanol, natural gas, and coal to $H_2$ for use in fuel cells to generate electricity. However, it is known that the WGS reaction is reversible and therefore inefficient, resulting in an end product having a high concentration of CO and requiring a bulky, heavy reactor. In, for example, fuel cell technology, the size of reactor needed to produce $H_2$ of sufficient purity and in adequate quantities is limiting in practical terms. As noted above, the $CO_2$-selective membranes described herein are not only highly selective for $CO_2$, but also advantageously thermally stable at elevated temperatures. Further, the membranes actively remove $CO_2$ from the $H_2$ product stream, thereby skewing the WGS reaction equilibrium towards $H_2$ production. The novel membranes of the present invention therefore provide significant advantages in production of $H_2$ by the WGS reaction.

Accordingly, in still yet another aspect of the present invention, novel WGS membrane reactors comprising $CO_2$-selective membranes as described above are provided, wherein a high pressure feed stream of, for example, a synthesis gas or any other suitable $H_2$ source is contacted with the membrane. The membrane reactors of the present invention alter the WGS reaction equilibrium by removing one of the reaction products, $CO_2$, from the feed stream, thereby shifting the WGS reaction towards production of $H_2$ rather than simply attempting to purify $H_2$ from a mixed gaseous stream. A substantially enriched $H_2$ end product results. This high purity $H_2$ product may be recovered at a higher pressure (the same as the feed stream pressure), rather than at the lower permeate pressure which would result from use of a $H_2$-selective membrane, thereby improving recovery as well as purity. Any suitable means for removing the $CO_2$ permeate from the low pressure side of the membrane may be utilized, such as a sweep gas (including air) or a vacuum placed at the low pressure side of the membrane. It will be appreciated by those of skill in the art that the high driving force generated by removal of the $CO_2$ permeate from the low pressure side of the membrane further skews the equilibrium of the WGS reaction to production of $H_2$, still further improving purity and recovery of the end product.

The novel WGS membrane reactors of the present invention thus provide significant advantages over existing WGS membrane reactors, such as for use in $H_2$ generation to provide electricity via fuel cell technology. Currently available membranes do not provide suitable selectivity for $H_2$. As has been described above, the membranes of the invention are highly selective for $CO_2$, and possess excellent thermal stability at temperatures in excess of those expected to be encountered in a fuel cell vehicle. The novel membranes of this invention allow fabrication of WGS membrane reactors which enhance the WGS reaction and decrease CO to 10 ppm or less in, for example, $H_2$ generated from a feed gas such as a synthesis gas. Accordingly, use of a $CO_2$-selective membrane for the reactor rather than a $H_2$-selective membrane improves both purity and recovery of the end product, eliminating the need for a separate compressor.

As described above, the use of a sweep gas or vacuum at the low pressure side of the membrane provides a high driving force for separation of $CO_2$, further improving purity and recovery of the final $H_2$ product. In the context of a fuel cell vehicle, the sweep gas function may be provided by airflow generated by movement of the vehicle. Accordingly, there is no need to divert power from the vehicle to generate air movement for removal of the $CO_2$ permeate. Therefore, it will be seen by those of skill in this art that WGS membrane reactors comprising the novel membranes of the present invention are eminently suited to fuel cell technology, allowing excellent recovery of a high purity $H_2$.

Other objects of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing.

Reference will now be made in detail to the presently preferred embodiments of the invention, examples of which are illustrated in the accompanying drawings.

DETAILED DESCRIPTION OF THE INVENTION

As summarized above, the present invention relates in one aspect to novel compositions of matter comprising a polyimide hard segment and an amino group-containing soft segment comprising a polyamine. The composition may also comprise an interfacially polymerized polyamide. The compositions and processes of the present invention may be accomplished by various means which are illustrated in the examples below. These examples are intended to be illustrative only, as numerous modifications and variations will be apparent to those skilled in the art.

The polyamines may be selected from the group consisting of poly (2-vinylpyridine), poly (4-vinylpyridine), polyethylenimine, polyallylamine, or any mixture thereof. Typically, the polyamines selected include polyethylenimines having a molecular weight of from about 600 to about 70,000 and polyallylamines having a molecular weight of from about 10,000 to about 60,000.

Typically, the amine group-containing soft segment will include a polyamine as described above in an amount of from about 30 to about 90 weight percent of the entire composition. The hard segment of the composition of the present invention may include a polyimide as described above in an amount of from about 10 to about 70 weight percent of the entire composition.

The hard segment of the compound of the present invention may be derived from a dianhydride having between about 8 and about 20 carbons and a diamine having between about 2 and about 30 carbons. Typically, the dianhydride is an aromatic compound, and may be selected from one of the group consisting of pyromellitic dianhydride (PMDA), 3,3',4,4'-benzophenone tetracarboxylic dianhydride, 4,4'-(hexafluoroisopropylidene)bis(phthalic anhydride), 4,4'-oxydiphthalic anhydride, diphenylsulfone-3,3'4,4'-tetracarboxylic dianhydride, and 3,3',4,4'-biphenyltetracarboxylic dianhydride. The diamine may be selected from the group consisting of phenylene diamine, methylene dianiline (MDA), methylene di-o-chloroaniline (MOCA), methylene bis(dichloroaniline), methylene dicyclohexylamine, methylene dichlorocyclohexylamine, methylene bis(dichlorocyclohexylamine), 4,4'-(hexafluoroisopropyledine)-bisaniline, 3,3'-diaminophenyl sulfone, 4,4'-diaminophenyl sulfone, 4,4'-dimethyl-3,3'-diaminohenyl sulfone, 2,4'-diamino cumene, methylene bis(di-o-toluidine), oxydianiline, bisaniline A, bisaniline M, bisaniline P, thiodianiline, 2,2-bis[4-(4-aminophenoxy)phenyl]sulfone, 4,4'-bis-(4-aminophenoxy) biphenyl, 1,4-bis(4-aminophenoxy) benzene, and 1,3-bis(4-aminophenoxy) benzene. The composition of the present invention may also include at least one salt of an amino acid selected from salts having the formulae:

wherein $R_1$, $R_2$ and $R_3$ are hydrogen or alkyl groups having from 1 to 4 carbon atoms, n is an integer ranging from 0 to 4, $A^{m+}$ is a cation having a valence of 1 to 3 and selected from metals of Groups IA, IIA, and IIIA of the Periodic Table of Elements and an amine cation having the formula:

wherein $R_4$ and $R_5$ are hydrogen or alkyl groups having from 1 to 4 carbon atoms, $R_6$ is hydrogen, an alkyl group of from 1 to 4 carbon atoms or an alkyl amine of from 2 to 6 carbon atoms and 1 to 4 nitrogen atoms, y is an integer ranging from 1 to 4, and m is an integer equal to the valence of the cation.

The interfacially polymerized polyamides of the invention may be synthesized from a polyamine, an acid chloride, and an organic solvent. The polyamine may be selected from the group consisting of polyethylenimine, polyallylamine, and any mixture thereof. Typically, the polyamine of choice is polyethylenimine. The acid chloride may be trimesoyl chloride, isophthaloyl chloride, and any mixture thereof. The organic solvent may be an isoparaffinic solvent, decane, dodecane, nonane, and any mixture thereof.

In another aspect of the present invention, membranes comprising the novel polyimide/amino group-containing compositions as described above are provided. Any of a number of known techniques are suitable for fabricating the membranes of this invention, such as knife casting, dip casting, or the like. The membranes may be fabricated to any desired shape, such as flat sheets or hollow fibers, in accordance with the desired use therefor.

The membranes of the present invention are highly selective for $CO_2$, with the $CO_2$ selectivity being provided by the amino group-containing soft segments. Advantageously, the membranes are also highly thermostable, with the thermostability being provided by the polyimide hard segments. In a preferred embodiment, the present invention provides a $CO_2$-selective membrane having a $CO_2$ selectivity of at least about 75, a $CO_2$ permeability of at least about 6000 GPU, and thermal stability at temperatures greater than about 200 C. As will be described below, the selectivity and thermal stability of the membranes of this invention provide significant advantages in the use thereof for producing an $H_2$-enriched product from a mixed gas feed stream.

EXAMPLE 1

A membrane comprising 50 weight % poly(4-vinylpyridine) and 50 weight % polyimide was prepared. To a solution containing 3 g of 4,4'-Oxydianiline (ODA) in 12.4 ml of DMF, 4.75 g of 4,4'-Oxydiphthalic anhydride (ODPA) was added gradually under mixing to make the polyamic acid. During the synthesis of the polyamic acid, an additional 26.3 ml of DMF was added to the solution to adjust for increases in the solution viscosity. To the resulting polyamic acid was added a solution of 7.75 g poly(4-vinylpyridine) in 25.4 ml DMF. An additional 20 ml of DMF was added to the solution. The resulting solution was used to cast a membrane by the technique of knife casting.

Figure 1:
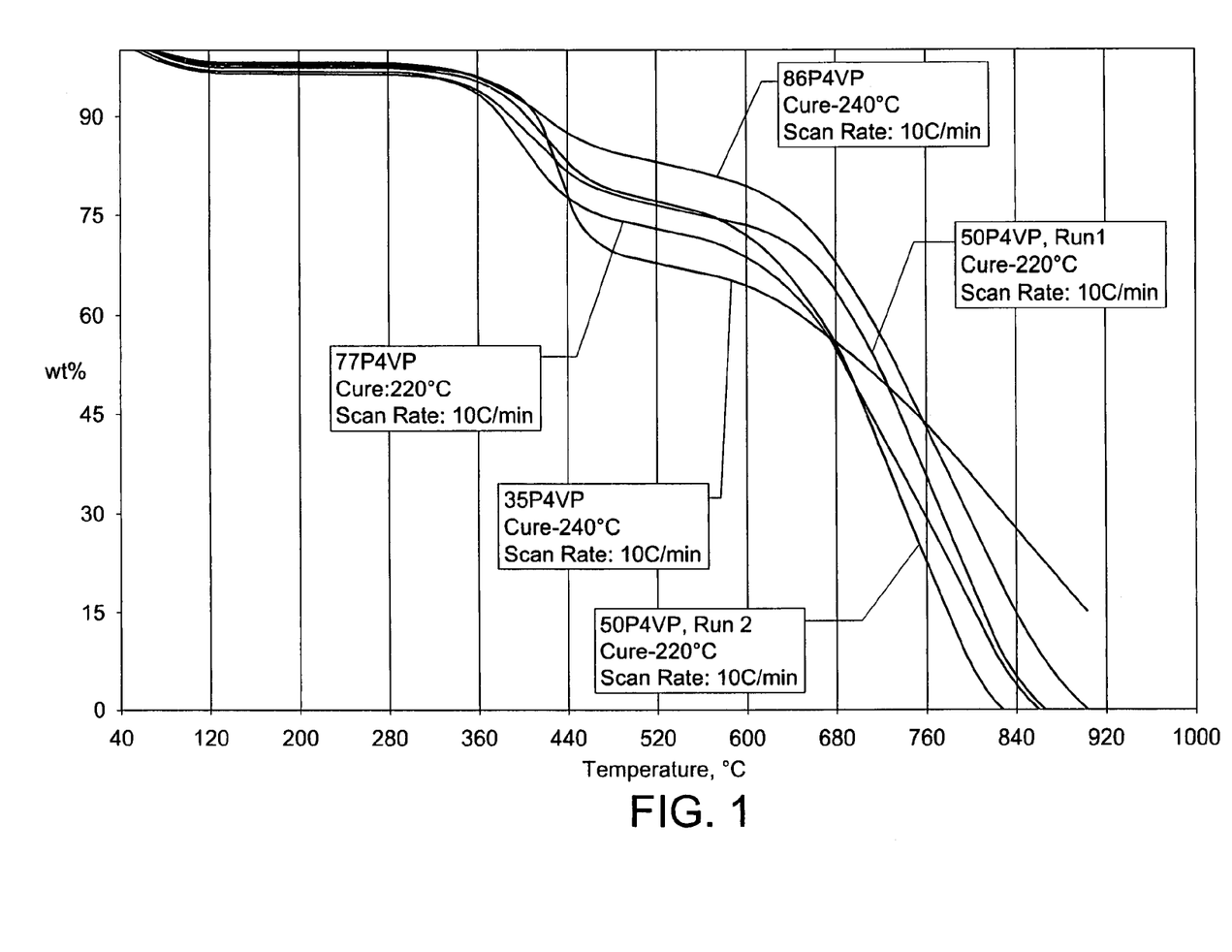
FIG. 1 shows the TGA analysis of the membrane of the present invention comprising 50 weight % poly(4-vinylpyridine) and 50 weight % polyimide.

The cast membrane was placed in a fume hood at ambient temperature overnight to allow evaporation of the DMF solvent. Following solvent evaporation, the membrane was dried at 120 C under nitrogen overnight. As a final step, the membrane was cured for 4.5 hours at 220 C under nitrogen. As shown in FIG. 1, thermal gravimetric analysis (TGA) indicated that the membrane had a thermal stability of about 280 C.

EXAMPLE 2

A membrane comprising 35 weight % poly(4-vinylpyridine) and 65 weight % polyimide was prepared as described in Example 1 except that 4.17 ml of poly(4-vinylpyridine) in 13.7 ml DMF were used, and the resulting membrane was cured at 240 C for 2.5 hours. The membrane had a thermal stability of about 280 C by TGA.

EXAMPLE 3

A membrane comprising 77 weight % poly(4-vinylpyridine) and 23 weight % polyimide was prepared as described in Example 1, with the appropriate amount of poly(4-vinylpyridine). The membrane had a thermal stability of about 280 C by TGA.

EXAMPLE 4

A membrane comprising 86 weight % poly(4-vinylpyridine) and 14 weight % polyimide was prepared as described in Example 1, with the appropriate amount of poly(4-vinylpyridine) and a curing time of 2.5 hours at 240 C. The membrane had a thermal stability of about 280 C by TGA.

EXAMPLE 5

Figure 2:
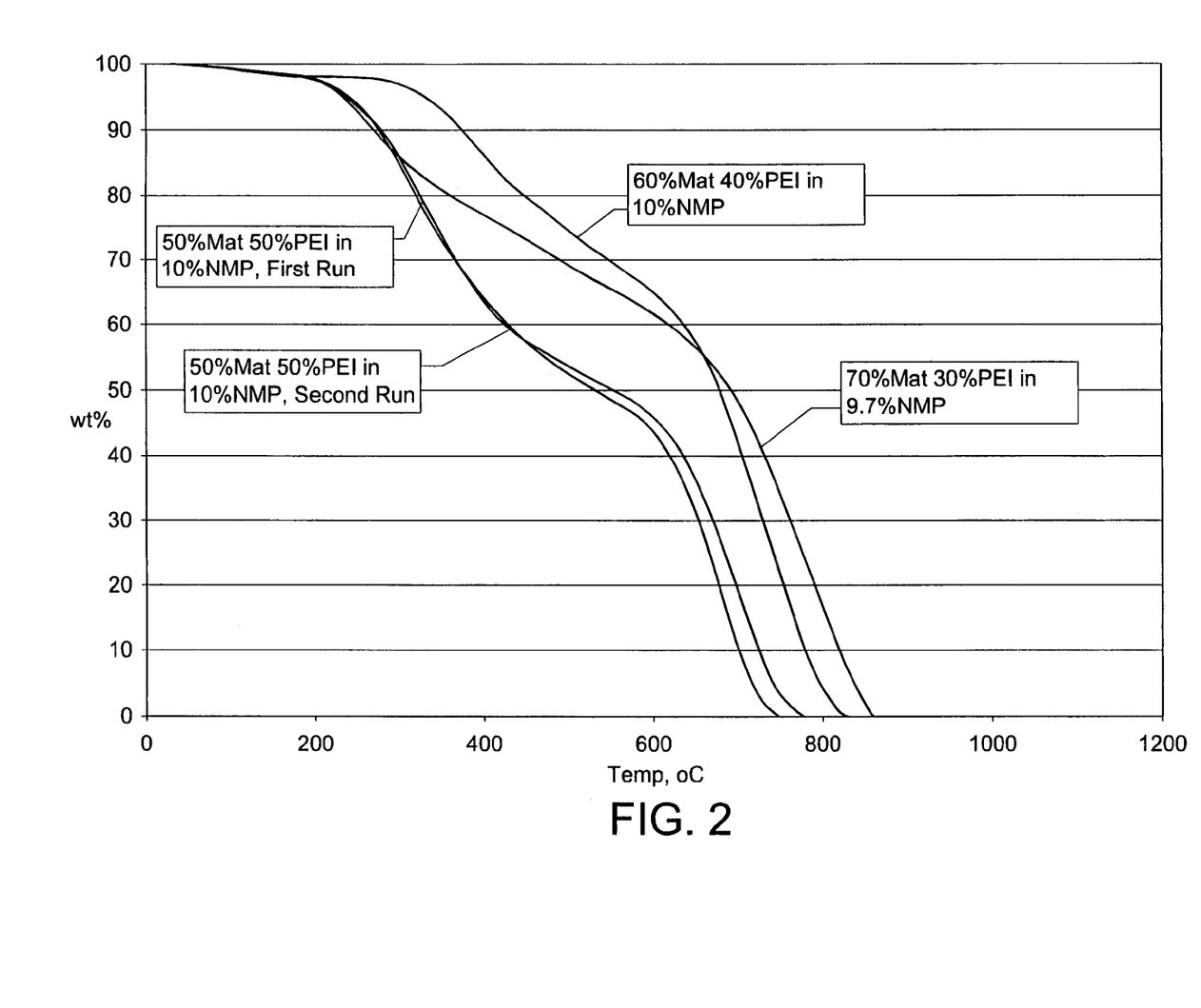
FIG. 2 shows the TGA analysis of the membrane of the present invention comprising 86 weight % poly(4-vinylpyridine) and 14 weight % polyimide.

A membrane comprising 50 weight % MATRIMID (a commercial polyimide available from Ciba Specialty Chemical, Brewster, N.Y.) and 50 weight % polyethylenimine was prepared by adding a solution of 0.9 g polyethylenimine in 1 ml N-methyl pyrrolidone (NMP) to a solution of 0.8 g MATRIMID in 12.3 ml NMP. The resulting solution was used to knife cast a membrane, which was placed in a fume hood at ambient temperature overnight to evaporate DMF. The membrane was then dried at 120 C under nitrogen overnight, followed by drying at 200 C under nitrogen for a period of 7 days. As shown in FIG. 2, the membrane had a thermal stability of about 200 C by TGA.

EXAMPLE 6

A membrane comprising 60 weight % MATRIMID and 40 weight % polyethylenimine was prepared as described in Example 5, except for the use of a solution of 0.8 g MATRIMID in 10 ml NMP and 0.53 g polyethylenimine in 1 ml NMP. The membrane had a thermal stability of about 200 C by TGA.

EXAMPLE 7

A membrane comprising 70 weight % MATRIMID and 30 weight % polyethylenimine was prepared as described in Example 5, except for the use of a solution of 1 g MATRIMID in 10 ml NMP and 0.43 g polyethylenimine in 1 ml NMP. The membrane had a thermal stability of about 200 C by TGA.

In yet another aspect of the present invention, a novel process for purifying $H_2$ from a mixed gaseous stream containing $H_2$ is disclosed. The process comprises contacting the gaseous stream, provided at any desired feed pressure in accordance with the method being conducted, with a first side of the $CO_2$-selective membrane of this invention as described above, followed by removing the $CO_2$-rich permeate from the low pressure, obverse side of the membrane. The membrane preferentially transports $CO_2$ by a facilitated transport mechanism, while $H_2$ is rejected by the membrane. Accordingly, a $H_2$-enriched retentate remains for subsequent processing and use.

The WGS reaction for conversion of CO and water to $H_2$ and $CO_2$ is known in the chemical and petroleum industries, and has potential application in the conversion of fuels, such as gasoline, diesel, methanol, ethanol, natural gas, and coal to $H_2$ for use in fuel cells. However, it is known that the WGS reaction is reversible and therefore inefficient, resulting in an end product having a high concentration of CO and requiring a bulky, heavy reactor. In, for example, fuel cell technology, the size of WGS reactor needed to produce $H_2$ of sufficient purity and in adequate quantities is limiting in practical terms. As noted above, the $CO_2$-selective membranes described herein are not only highly selective for $CO_2$, but also advantageously thermally stable at elevated temperatures. The novel membranes of the present invention therefore provide significant advantages in production of $H_2$ by the WGS reaction.

Figure 3:
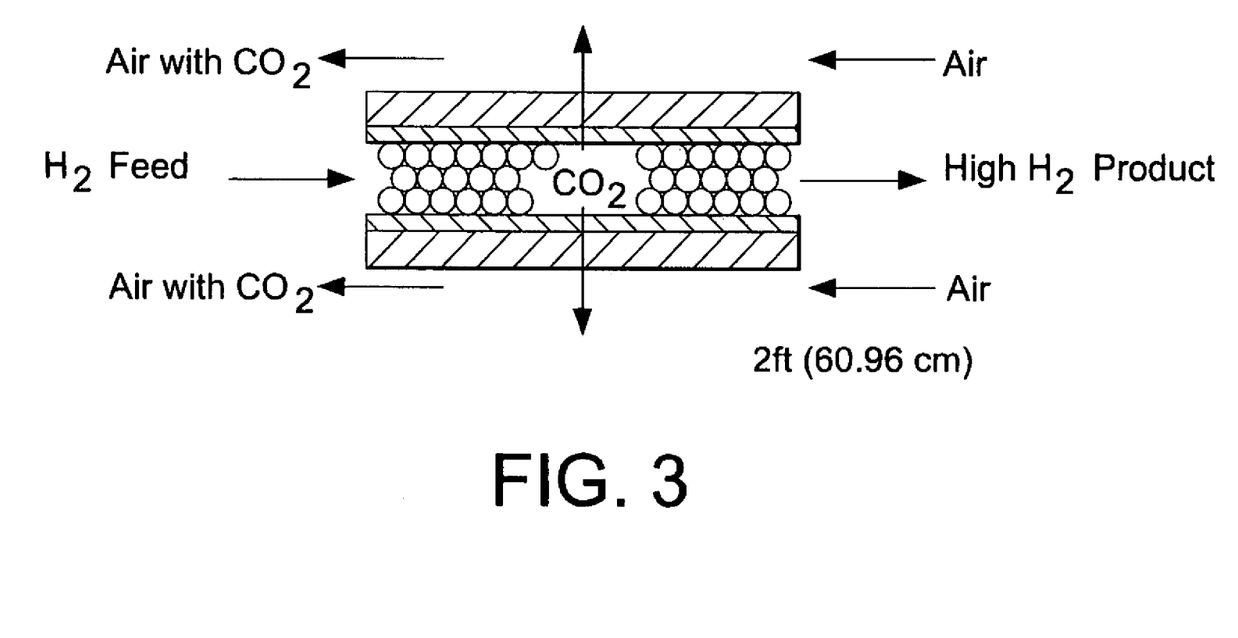
FIG. 3 is a schematic representation of the $CO_2$-selective membrane reactor of the present invention.

Accordingly, in still yet another aspect of the present invention, novel WGS membrane reactors comprising $CO_2$-selective membranes as described above are provided, wherein a high pressure feed stream of, for example, a synthesis gas or any other suitable $H_2$ source is contacted with the membrane. As shown schematically in FIG. 3, the membrane reactor of the present invention alters the WGS reaction equilibrium by removing one of the reaction products, $CO_2$, from the feed stream, thereby shifting the WGS reaction towards production of $H_2$ rather than simply attempting to purify $H_2$ from a mixed gaseous stream. A substantially pure $H_2$ end product results. This high purity $H_2$ product may be recovered at a higher pressure (the same as the feed stream pressure), rather than at the lower permeate pressure which would result from use of a $H_2$-selective membrane, thereby improving recovery as well as purity. Any suitable means for removing the $CO_2$ permeate from the low pressure side of the membrane may be utilized, such as a sweep gas (including air) or a vacuum placed at the low pressure side of the membrane. It will be appreciated by those of skill in the art that the high driving force generated by removal of the $CO_2$ permeate from the low pressure side of the membrane further skews the equilibrium of the WGS reaction to production of $H_2$, still further improving purity and recovery of the end product.

In the following examples, WGS membrane reactors of known design are fabricated and used to purify $H_2$ from synthesis gas (syngas). The reactors comprise the novel $CO_2$-selective membranes of this invention as described above. The membranes are configured in hollow-fiber membrane modules, with each module packed with a conventional WGS catalyst of $CuO/ZnO/Al_2O_3$ located on the feed side of the membrane module. However, it will be appreciated that any suitable membrane reactor design may be constructed, such as a spiral-wound membrane module to increase membrane surface area per unit volume. Each hollow fiber has an inside diameter of 940 microns, a length of 2 feet, and an effective membrane thickness of 5 microns. The catalyst possesses a specific surface area of about 42 $m^2/g$ and a porosity of about 0.5. Except as otherwise noted, the following conditions are maintained: (1) the inlet temperature to the reactor is 200 C; (2) syngas pressure in the reactor is 3 atm; (3) the molar ratio of water to the CO in the syngas is 1.2 in the WGS reaction; (4) the syngas flow on the high pressure side of the membrane (3 atm) is counter current to the flow of air sweep (1 atm) on the low pressure permeate side of the membrane; and (5) the molar flow rate ratio of the sweep gas to the syngas is 1.

EXAMPLE 8

A WGS membrane reactor containing 10,000 hollow fibers comprising the membranes of the present invention as described above is fabricated to produce $H_2$ from syngas produced by autothermal reforming of liquid hydrocarbon (gasoline), consisting of on average (dry basis) 27% $H_2$, 24% CO, 1% $CO_2$, and 48% $N_2$. The CO mole fraction in the $H_2$ product exiting the reactor is 7.65 ppm, well below the desirable level of 10 ppm for fuel cells. The $H_2$ product is also significantly enriched in the final product, at 50.5% (from 27% in the syngas feed stream).

EXAMPLE 9

The WGS membrane reactor is the same as in Example 8. Syngas from steam reforming of methane is used, consisting on average of 75% $H_2$, 24% CO, and 1% $CO_2$ (dry basis). Carbon monoxide concentration in the final $H_2$ product is 12.5 ppm, and $H_2$ mole fraction is 99.99% (from 75% in the syngas).

EXAMPLE 10

The WGS membrane reactor and syngas composition are the same as in Example 9, except that the membrane surface area is effectively doubled by doubling the number of hollow membrane fibers to 20,000. Carbon monoxide concentration in the final $H_2$ product is 6.3 ppm, and $H_2$ mole fraction is again 99.99%.

EXAMPLE 11

Figure 4:
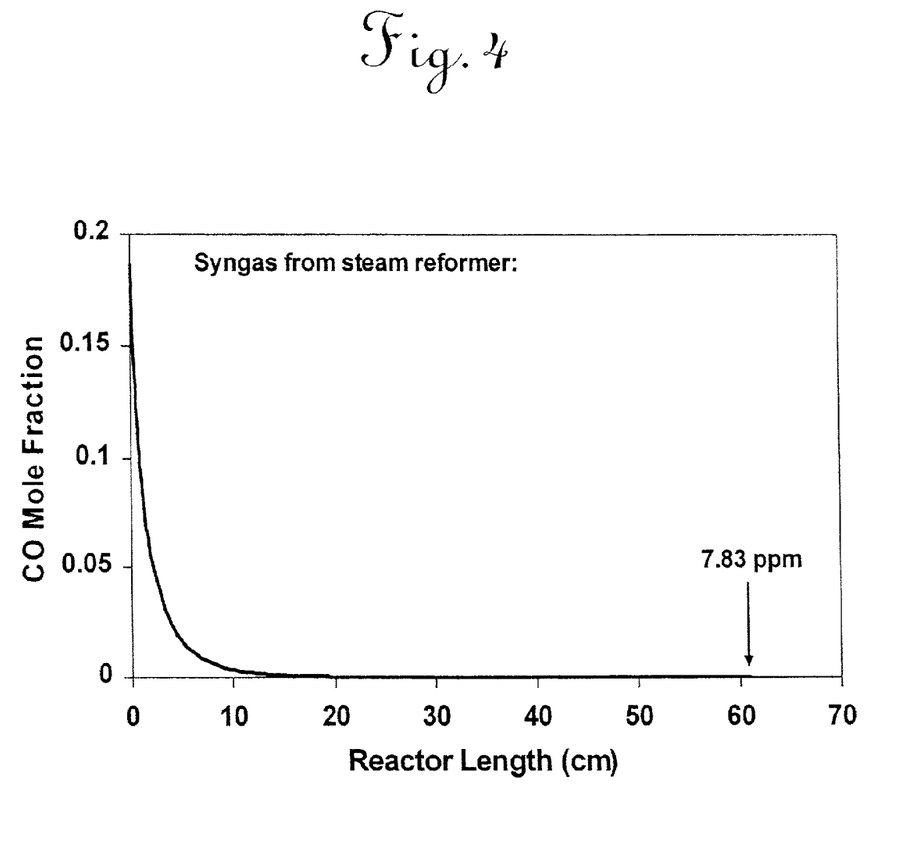
FIG. 4 shows the CO mole fraction from syngas produced by steam reforming of methane after passage through a $CO_2$-selective membrane reactor of the present invention.

The WGS membrane reactor is the same as in Example 9, except that an inlet temperature of 180 C is used, the membrane module comprises 20,500 hollow fibers, and the molar flow rate ratio of air sweep to syngas is 0.75. Syngas from steam reforming of methane (Example 9) is used. As shown in FIG. 4, CO concentration in the $H_2$ product exiting the reactor is 7.83 ppm. The $H_2$ product mole fraction is again 99.99% (dry basis).

EXAMPLE 12

Figure 5:
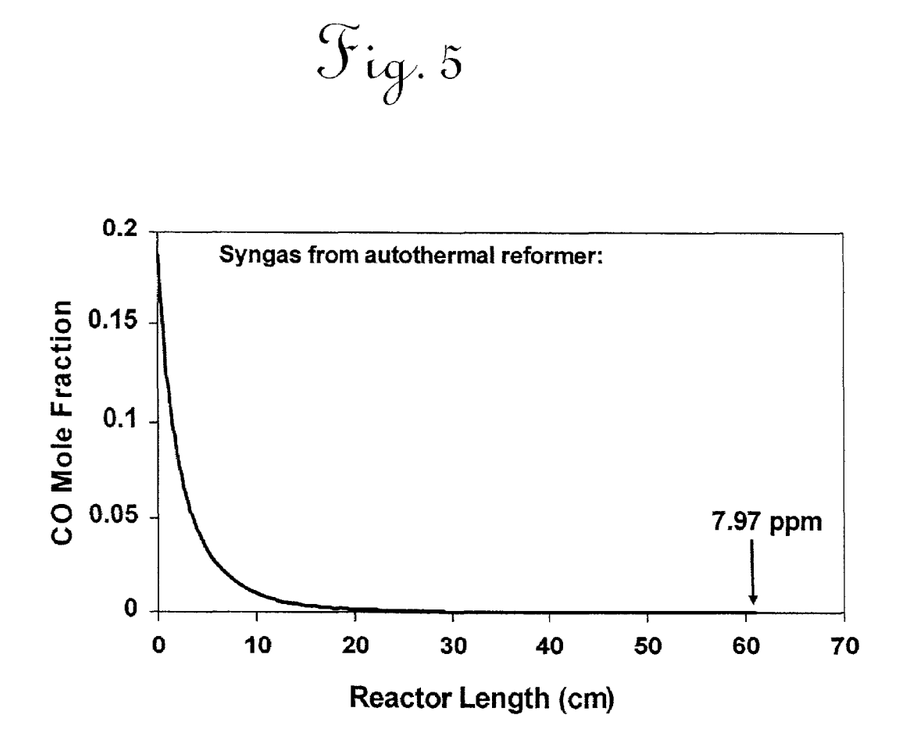
FIG. 5 shows the CO mole fraction from syngas produced by autothermal reformation of gasoline after passage through a $CO_2$-selective membrane reactor of the present invention.

The WGS membrane reactor is the same as in Example 11, except that the membrane module comprises 24,500 hollow fibers, and the molar flow rate ratio of air sweep to syngas is 1. Syngas from autothermal reforming of liquid hydrocarbon (Example 8) is used. As shown in FIG. 5, CO concentration in the $H_2$ product exiting the reactor is 7.97 ppm. The $H_2$ product concentration is 49.13% (dry basis).

The novel WGS membrane reactors of the present invention thus provide significant advantages over existing WGS membrane reactors for producing $H_2$. Currently available membranes do not provide suitable selectivity for $H_2$. As has been described above, the membranes of the invention are highly selective for $CO_2$, and possess excellent thermal stability at temperatures in excess of those expected to be encountered in, for example, a fuel cell vehicle. The novel membranes of this invention allow construction of WGS membrane reactors which specifically enhance the WGS reaction and decrease CO to 10 ppm or less in, for example, $H_2$ generated from a feed gas such as a synthesis gas. Advantageously, recovery of the $H_2$ product at a high pressure, similar to the pressure at which the feed gas is provided, improves recovery without need for a separate compressor to increase product gas recovery. Accordingly, use of a $CO_2$-selective membrane for the reactor rather than a $H_2$-selective membrane improves both purity and recovery of the end product.

As described above, the use of a sweep gas or vacuum at the low pressure side of the membrane provides a high driving force for separation of $CO_2$, further improving purity and recovery of the final $H_2$ product. The $CO_2$ contaminant is immediately removed, biasing the WGS reaction in the direction of production of $H_2$. In the context of a fuel cell vehicle, the sweep gas function may be provided by airflow generated by movement of the vehicle. Accordingly, there is no need to divert power from the vehicle to generate air movement for removal of the $CO_2$ permeate. Therefore, it will be seen by those of skill in this art that WGS membrane reactors comprising the novel membranes of the present invention are eminently suited to fuel cell technology, allowing excellent recovery of a high purity $H_2$.

In addition to energy efficiency increases, the WGS membrane reactor of the present invention may decreased the required size of the reactor due to its ability to alter the WGS reaction equilibrium to production of $H_2$. Further, the reactor may be configured as a microchannel reactor that can decrease heat and mass transport limitations for the reaction. In this manner, reactor size may be further decreased. These features are particularly valuable in applications where space is at a premium such as in fuel cell technology for vehicles. In this fashion, not only are equipment cost and capital investment decreased, but also further increases in energy efficiency may be achieved due to the size and weight reductions in the reactor.

The membranes and reactors of the present invention have applications in other industries. For biomass resource development, the membrane reactor may be used for the WGS reaction on syngas derived from partial oxidation of biomass or bio-derived products such as ethanol to produce a $H_2$ product of high purity. For hydrogen/ammonia production in the chemical and petroleum industries, the membrane reactor may not only decrease the size of the WGS reactor, but also may simplify the $H_2$ production process. For example, the $CO_2$-removal step necessary for conventional WGS membrane reactors (via amine scrubbing or a pressure-swing adsorption process as is currently required) is eliminated.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

The invention claimed is:

1. A process for purification of $H_2$ from a synthesis gas containing $CO_2$ by the water-gas-shift reaction, comprising:
contacting a $CO_2$-containing synthesis gas stream with a first side of a $CO_2$-selective membrane comprising a polyimide hard segment and a polyamine, wherein the membrane further comprises at least one salt of an amino acid selected from salts having the formulae:

wherein $R_1$, $R_2$ and $R_3$ are hydrogen or alkyl groups having from 1 to 4 carbon atoms, n is an integer ranging from 0 to 4, $A^{m+}$ is a cation having a valence of 1 to 3 and selected from metals of Groups IA, IIA, and IIIA of the Periodic Table of Elements and an amine cation having the formula:

wherein $R_4$ and $R_5$ are hydrogen or alkyl groups having from 1 to 4 carbon atoms, $R_6$ is hydrogen, an alkyl group of from 1 to 4 carbon atoms or an alkyl amine of from 2 to 6 carbon atoms and 1 to 4 nitrogen atoms, y is an integer ranging from 1 to 4, and m is an integer equal to the valence of the cation; and
withdrawing a $CO_2$-enriched permeate from an obverse side of said $CO_2$-selective membrane.

2. The process set forth in claim 1, wherein said polyimide is derived from a dianhydride having between about 8 and about 20 carbons and a diamine having between about 2 and about 30 carbons.

3. The process set forth in claim 2, wherein said dianhydride is an aromatic compound.

4. The process set forth in claim 3, wherein said aromatic compound is selected from the group consisiting of pyromellitic dianhydride, 3,3',4,4'-benzophenone tetracarboxylic dianhydride, 4,4'-(hexafluoroisopropylidene)bis(phthalic anhydride), 4,4'-oxydiphthalic anhydride, diphenylsulfone-3,3'4,4'-tetracarboxylic dianhydride, and 3,3',4,4'-biphenyltetracarboxylic dianhydride.

5. The process set forth in claim 4, wherein said dianhydride is pyromellitic dianhydride.

6. The process set forth in claim 2, wherein said diamine is selected from the group consisting of phenylene diamine, methylene dianiline (MDA), methylene di-o-chloroaniline (MOCA), methylene bis(dichloroaniline), methylene dicyclohexylamine, methylene dichlorocyclohexylamine, methylene bis(dichlorocyclohexylamine), 4,4'-(hexafluoroisopropyledine)-bisaniline, 3,3'-diaminophenyl sulfone, 4,4'-diaminophenyl sulfone, 4,4'-dimethyl-3,3'-diaminohenyl sulfone, 2,4'-diamino cumene, methylene bis(di-o-toluidine), oxydianiline, bisaniline A, bisaniline M, bisaniline P, thiodianiline, 2,2-bis[4-(4-aminophenoxy)phenyl]sulfone, 4,4'-bis-(4-aminophenoxy) biphenyl, 1,4-bis(4-aminophenoxy) benzene, and 1,3-bis(4-aminophenoxy) benzene.

7. The process set forth in claim 6, wherein said diamine is methylene di-o-chloroaniline.

8. The process set forth in claim 1, wherein said polyamine is selected from the group consisting of poly (2-vinylpyridine), poly (4-vinylpyridine), polyethylenimine, polyallylamine, and any mixture thereof.

9. The process set forth in claim 1, wherein said polyamine is included in said membrane in an amount of from about 30 to about 90 weight percent, and said polyimide is included in an amount of from about 10 to about 70 weight percent.

10. A process for purification of $H_2$ from a synthesis gas containing $CO_2$ by the water-gas-shift reaction, comprising:
contacting a $CO_2$-containing synthesis gas stream with a first side of a $CO_2$-selective membrane comprising an interfacially polymerized polyamide; and
withdrawing a $CO_2$-enriched permeate from an obverse side of said $CO_2$-selective membrane.

11. The process set forth in claim 10, wherein said interfacially polymerized polyamide is synthesized from a polyamine, an acid chloride, and an organic solvent.

12. The process set forth in claim 11, wherein said polyamine is selected from the group consisting of polyethylenimine, polyallylamine, and any mixture thereof.

13. The process set forth in claim 11, wherein said polyamine is polyethylenimine.

14. The process set forth in claim 11, wherein said acid chloride is selected from the group consisting of trimesoyl chloride, isophthaloyl chloride, and any mixture thereof.

15. The process set forth in claim 11, wherein said organic solvent is selected from the group consisting of an isoparaffinic solvent, decane, dodecane, nonane, and any mixture thereof.

16. A $CO_2$-selective membrane comprising a polyimide hard segment and an amino group-containing soft segment comprising a polyamine, wherein the membrane further comprises at least one salt of an amino acid selected from salts having the formulae:

wherein $R_1$, $R_2$ and $R_3$ are hydrogen or alkyl groups having from 1 to 4 carbon atoms, n is an integer ranging from 0 to 4, $A^{m+}$ is a cation having a valence of 1 to 3 and selected from metals of Groups IA, IIA, and IIIA of the Periodic Table of Elements and an amine cation having the formula:

$$H-\underset{R_5}{\overset{R_4}{\underset{|}{\overset{|}{N^+}}}}-(CH_2)_y-R6$$

wherein $R_4$ and $R_5$ are hydrogen or alkyl groups having from 1 to 4 carbon atoms, $R_6$ is hydrogen, an alkyl group of from 1 to 4 carbon atoms or an alkyl amine of from 2 to 6 carbon atoms and 1 to 4 nitrogen atoms, y is an integer ranging from 1 to 4, and m is an integer equal to the valence of the cation.

17. The $CO_2$-selective membrane of claim 16, wherein said polyamine is selected from the group consisting of poly(2-vinylpyridine), poly(4-vinylpyridine), polyethylenimine, polyallylamine, and any mixture thereof.

18. The $CO_2$-selective membrane of claim 16, wherein said polyimide is derived from a dianhydride having between about 8 and about 20 carbons and a diamine having between about 2 and about 30 carbons.

19. The $CO_2$-selective membrane of claim 18, wherein said dianhydride is an aromatic compound.

20. The $CO_2$-selective membrane of claim 19, wherein said aromatic compound is selected from the group consisiting of pyromellitic dianhydride, 3,3',4,4'-benzophenone tetracarboxylic dianhydride, 4,4'-(hexafluoroisopropylidene)bis(phthalic anhydride), 4,4'-oxydiphthalic anhydride, diphenylsulfone-3,3'4,4'-tetracarboxylic dianhydride, and 3,3',4,4'-biphenyltetracarboxylic dianhydride.

21. The $CO_2$-selective membrane of claim 18, wherein said dianhydride is pyromellitic dianhydride.

22. The $CO_2$-selective membrane of claim 18, wherein said diamine is selected from the group consisting of phenylene diamine, methylene dianiline (MDA), methylene di-o-chloroaniline (MOCA), methylene bis(dichloroaniline), methylene dicyclohexylamine, methylene dichlorocyclohexylamine, methylene bis(dichlorocyclohexylamine), 4,4'-(hexafluoroisopropyledine)-bisaniline, 3,3'-diaminophenyl sulfone, 4,4'-diaminophenyl sulfone, 4,4'-dimethyl-3,3'-diaminohenyl sulfone, 2,4'-diamino cumene, methylene bis(di-o-toluidine), oxydianiline, bisaniline A, bisaniline M, bisaniline P, thiodianiline, 2,2-bis[4-(4-aminophenoxy)phenyl]sulfone, 4,4'-bis-(4-aminophenoxy)biphenyl, 1,4-bis(4-aminophenoxy) benzene, and 1,3-bis(4-aminophenoxy) benzene.

23. The $CO_2$-selective membrane of claim 18, wherein said diamine is methylene di-o-chloroaniline.

24. The $CO_2$-selective membrane of claim 16, wherein said polyamine is included in an amount of from about 30 to about 90 weight percent, and said polyimide is included in an amount of from about 10 to about 70 weight percent.

25. A water-gas-shift membrane reactor comprising the $CO_2$-selective membrane of claim 16.

26. A $CO_2$-selective membrane comprising an interfacially polymerized polyamide, wherein said interfacially polymerized polyamide is synthesized from a polyamine, an acid chloride, and an organic solvent.

27. The $CO_2$-selective membrane of claim 26, wherein said polyamine is selected from the group consisting of polyethylenimine, polyallylamine, and any mixture thereof.

28. The $CO_2$-selective membrane of claim 27, wherein said polyamine is polyethylenimine.

29. The $CO_2$-selective membrane of claim 26, wherein said acid chloride is selected from the group consisting of trimesoyl chloride, isophthaloyl chloride, and any mixture thereof.

30. The $CO_2$-selective membrane of claim 26, wherein said organic solvent is selected from the group consisting of an isoparaffinic solvent, decane, dodecane, nonane, and any mixture thereof.

31. A water-gas-shift membrane reactor comprising the $CO_2$-selective membrane of claim 26.

32. A composition of matter comprising a polyimide hard segment and an amino group-containing soft segment comprising a polyamine, wherein the composition further comprises at least one salt of an amino acid selected from salts having the formulae:

wherein $R_1$, $R_2$ and $R_3$ are hydrogen or alkyl groups having from 1 to 4 carbon atoms, n is an integer ranging from 0 to 4, $A^{m+}$ is a cation having a valence of 1 to 3 and selected from metals of Groups IA, IIA, and IIIA of the Periodic Table of Elements and an amine cation having the formula:

wherein $R_4$ and $R_5$ are hydrogen or alkyl groups having from 1 to 4 carbon atoms, $R_6$ is hydrogen, an alkyl group of from 1 to 4 carbon atoms or an alkyl amine of from 2 to 6 carbon atoms and 1 to 4 nitrogen atoms, y is an integer ranging from 1 to 4, and m is an integer equal to the valence of the cation.

33. The composition of claim 32, wherein said polyamine is selected from the group consisting of poly (2-vinylpyridine), poly (4-vinylpyridine), polyethylenimine, polyallylamine, and any mixture thereof.

34. The composition of claim 32, wherein said polyimide is derived from a dianhydride having between about 8 and about 20 carbons and a diamine having between about 2 and about 30 carbons.

35. The composition of claim 34, wherein said dianhydride is an aromatic compound.

36. The composition of claim 35, wherein said aromatic compound is selected from the group consisiting of pyromellitic dianhydride, 3,3',4,4'-benzophenone tetracarboxylic dianhydride, 4,4'-(hexafluoroisopropylidene)bis(phthalic anhydride), 4,4'-oxydiphthalic anhydride, diphenylsulfone-3,3'4,4'-tetracarboxylic dianhydride, and 3,3',4,4'-biphenyltetracarboxylic dianhydride.

37. The composition of claim 34, wherein said dianhydride is pyromellitic dianhydride.

38. The composition of claim 34, wherein said diamine is selected from the group consisting of phenylene diamine, methylene dianiline (MDA), methylene di-o-chloroaniline (MOCA), methylene bis(dichloroaniline), methylene dicyclohexylamine, methylene dichlorocyclohexylamine, methylene bis(dichlorocyclohexylamine), 4,4'-(hexafluoroisopropyledine)-bisaniline, 3,3'-diaminophenyl sulfone, 4,4'-diaminophenyl sulfone, 4,4'-dimethyl-3,3'-diaminohenyl sulfone, 2,4'-diamino cumene, methylene bis(di-o-toluidine), oxydianiline, bisaniline A, bisaniline M, bisaniline P, thiodianiline, 2,2-bis[4-(4-aminophenoxy)phenyl]sulfone, 4,4'-bis-(4-aminophenoxy) biphenyl, 1,4-bis(4-aminophenoxy) benzene, and 1,3-bis(4-aminophenoxy) benzene.

39. The composition of claim 34, wherein said diamine is methylene di-o-chloroaniline.

40. The composition of claim 32, wherein said polyamine is included in an amount of from about 30 to about 90 weight percent, and said polyimide is included in an amount of from about 10 to about 70 weight percent.

* * * * *